United States Patent [19]

Holley, Jr.

[11] 3,781,892

[45] *Dec. 25, 1973

[54] POSITION PLOTTER

[76] Inventor: George M. Holley, Jr., 510 Sheldon Rd., Grosse Pointe Shores, Mich. 48236

[*] Notice: The portion of the term of this patent subsequent to Nov. 23, 1988, has been disclaimed.

[22] Filed: Nov. 16, 1971

[21] Appl. No.: 199,241

Related U.S. Application Data

[63] Continuation-in-part of Ser. No. 889,080, Dec. 30, 1969, Pat. No. 3,623,102.

[52] U.S. Cl. .................... 343/112 PT, 343/117 R
[51] Int. Cl. ............................................. G01s 5/08
[58] Field of Search .................... 343/112 PT, 117

[56] References Cited
UNITED STATES PATENTS

| 3,623,102 | 11/1971 | Holley, Jr. | 343/112 PT |
| 2,247,029 | 6/1941 | Luck | 343/112 PT |
| 2,296,041 | 9/1942 | Luck | 343/112 PT |
| 2,191,730 | 2/1940 | Sjostrand | 343/112 PT |
| 2,043,336 | 6/1936 | Sjostrand | 343/112 R |

Primary Examiner—Benjamin A. Borchelt
Assistant Examiner—Denis H. McCabe
Attorney—Burton & Parker

[57] ABSTRACT

A position plotter having a pair of bearing indicators disposed in relation to a navigation chart to show at their intersection the position of a vessel on the chart are enslaved to a pair of radio direction finders mounted on a rotatable azimuth table whereby the indicators and chart are independent of the vessel's heading when the table is rotated to a predetermined azimuth setting.

4 Claims, 3 Drawing Figures

PATENTED DEC 25 1973      3,781,892
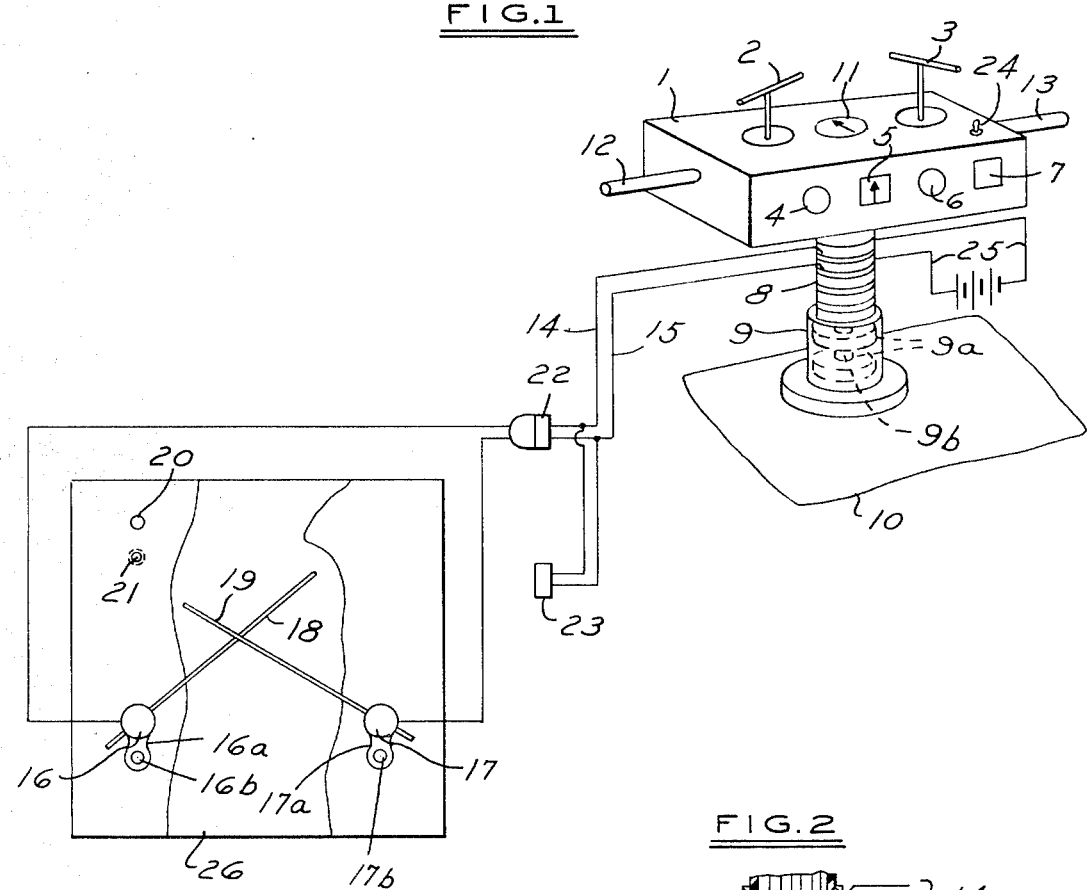
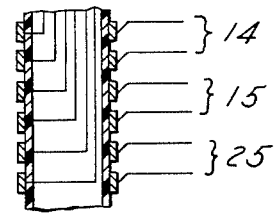
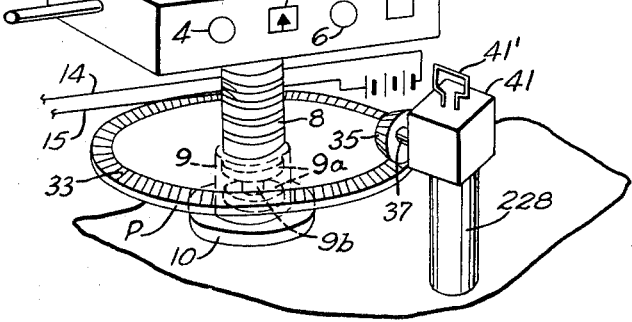

POSITION PLOTTER

This application is a continuation-in-part of application Ser. No. 889,080, filed Dec. 30, 1969, from which the aforesaid patent will issue.

BACKGROUND OF THE INVENTION

This invention relates to a further development of the Position Plotter disclosed in my U.S. Pat. No. 3,623,102 which will issue Nov. 23, 1971.

In the art of navigation it is well known to plot a vessel's position by taking radio bearings of distant radio transmitters with the charted intersection of the bearings giving the charted position of the vessel. Suggestions have been made in the prior art to embody such method of plotting in an automatic position plotter utilizing a pair of bearing indicators either in the form of mechanical pointers or light rays which are enslaved to radio direction finding apparatus whereby the intersection of the bearing indicators on a navigation chart associated with them will give the navigator the vessel's position. One difficulty immediately arising is that as the vessel's heading changes the bearing indicators will show a false bearing on the chart. This results from the fact that as the indicators are enslaved to the radio direction finders and function in response to changes in relative rotation between the vessel and the directional antennae, when the vessel's heading changes there are concomitant changes in the relative bearing of the transmitters as reflected by rotation of the antennae of the radio direction finders relative to the vessel in order that the antennae still point toward the transmitters.

The prior art has treated this difficulty in general by either of two different approaches. First, electronically utilizing sophistic translation systems which give a read-out that is unrelated to vessel heading. The cost of such an approach is prohibitive for the average pleasure boater. The second approach has been essentially mechanical and has generally involved azimuthally orienting the navigation chart and bearing indicators and then maintaining such azimuthal orientation during swinging of the vessel's heading. This second approach has led to the necessity of providing rather large and complicated mechanical apparatus for swinging an entire chart and essentially ties the navigation chart to a fixed location in the vessel. Therefore, both a less expensive approach than the prior art treatment, and one which will give the boater greater flexibility in use, are desirable.

SUMMARY OF THE INVENTION

This invention has for its primary object the provision of a relatively inexpensive position plotter for use in pleasure boats and the like and wherein the plotter shows either continuously or whenever desired on a navigation chart the vessel's position, with the principal advantage being that the chart need not be azimuthally oriented nor maintained in a given rotated position relative to the vessel, and can in fact be moved about the vessel, and even during such movement will continuously or as desired indicate the vessel's position thereon.

In order to divorce the position of the navigation chart and the bearing indicators from vessel heading and from the necessity of maintaining azimuthal orientation of the chart or bearing indicators during swinging of the vessel, I have mounted a pair of radio direction finders to which the bearing indicators are enslaved, on an azimuth table which is either manually or automatically positioned at a determined azimuth setting, and the relative position of the bearing indicators to the transmitter locations and azimuth representation and the navigation chart are determined while the azimuth table is at its preselected azimuth setting. Movement of the bearing indicators relative to the chart then becomes dependent upon relative rotation between the antennae of the radio direction finders and the azimuth table rather than as a function of the relative rotation between the antennae and the vessel heading. As a consequence, the vessel can swing without affecting the bearing indicators provided the azimuth table is held at its preset azimuth setting.

BRIEF DESCRIPTION OF THE DRAWING

FIG. 1 is a perspective schematic representation of the improved position plotter; and FIG. 2 is a schematic cross-section through the slip ring assembly at the base of the azimuth table.

FIG. 3 is a perspective schematic representation of the Position Plotter showing a means of continuously maintaining the azimuth table to a selected azimuth setting.

DESCRIPTION OF THE ILLUSTRATIVE EMBODIMENT

As shown in FIG. 1, 10 represents a portion of the vessel, such as a pleasure boat. Fixedly mounted thereon is an azimuth table support 9 internally provided with bearings 9a for carrying a vertical shaft 9b which is secured at its upper end to an azimuth table 1. As shown, the azimuth table comprises a hollow box-like structure having oppositely projecting handles 12 and 13 by which the vessel operator may selectively rotate the azimuth table to a predetermined azimuth setting. Mounted on the table are a pair of automatic radio direction finders whose directional antennae are represented at 2 and 3 and whose construction and operation are more fully disclosed in my U.S. Pat. Nos. 3,419,866; 3,524,187; 3,623,102, and an application of Robert D. Leland, Ser. No. 51,627 filed July 1, 1970. Suffice it to say that these automatic radio direction finders are intended to be tuned to two distant radio transmitters whose locations are shown on a navigation chart with each direction finder having a reversible motor connected to its antenna maintaining a predetermined angular relationship between the directional antenna and the distant transmitter to which it is tuned. As the azimuth table 1 swings, either by intentional rotation by the vessel operator moving the table through the medium of handles 12 and 13, or as the vessel swings, each of the automatic radio direction finders 2 and 3 will maintain their preset angular antenna relationship with the distant transmitter to which it is tuned. Dials and switches 4, 5, 6 and 7 schematically shown in FIG. 1 are for calibrating and adjusting the automatic radio direction finders as will be well understood by those skilled in the art.

At 11 a magnetic compass is shown which will enable the vessel operator to swing the azimuth table to a preselected azimuth setting in relation to the earth. If desired, the azimuth table may be automatically and continuously positioned as by mechanism similar to that indicated by reference numeral 41 in FIG. 1 of my aforesaid U.S. Pat. No. 3,623,102, and as illustrated in FIG. 3 herein. A plate P is fixedly attached to vertical shaft 9b which is secured at its upper end to azimuth table 1. The plate P is provided with a bevel gear periphery 33 meshing with a bevel pinion 35 on a position control shaft 37. The control shaft 37 is engaged with an assembly 41 for automatically and continuously rotatably positioning the table to a preselected azimuth position. While the automatic platform positioning apparatus 41 is shown as an automatic radio direction finder, and such is preferred for reasons of economy, any other suitable mechanism, such as gyro control, magnetic control or the like, may be employed. The R.D.F. unit includes a directional antenna 41'. A reversible electric motor rotates the antenna in opposite directions to maintain it at a given angular relation with the transmitter to which its receiver is tuned. Any suitable connection between the motor and antenna and position control shaft 37 may be provided.

At the base of the azimuth table is a slip ring assembly generally indicated at 8 and schematically shown in cross section in FIG. 2. Leads 25 connect a source of power for operating the radio direction finders. Two-wire cables 14 and 15 extend from Selsyn transmitters (not shown) connected to the directional antennae to be operated thereby, to Selsyn receiver motors 16 and 17 which swingably carry the bearing indicators 18 and 19. The Selsyn receiver motors include base portions 16a and 17a which are adapted to be supported on the navigation chart 26. Each base includes a depending dowel pin (not shown) received in an aperture of the chart centered at the location of a transmitting station, such as the aperture 20 designating a third transmitter location on chart 26. Each Selsyn motor base also includes an aperture for receiving a screw member 16b and 17b which is threaded into a tapped hole adjacent the transmitter location aperture such as the hole 21 adjacent aperture 20. Each of the apertures in the Selsyn motor bases may be slightly overside the screw members 16b and 17b to permit slight angular adjustment of the bearing indicators 18 and 19 during setup of the plotter as hereinafter explained.

The Selsyn transmitters are carried by the azimuth table and are connected to the antennae to respond to rotation thereof relative to the table. Both the Selsyn transmitters and receiver motors are well understood in the art and need not be described in detail. It is to be understood, however, that I have used the term Selsyn in a generic sense to indicate an electric servomechanism which will cause the bearing indicators 18 and 19 to swing in accordance with the rotation of their respective directional antenna relative to the azimuth table, as for example indicator 18 is enslaved to antenna 2 and indicator 19 is enslaved to antenna 3.

It should also be understood that while I have shown the power source for the leads 25 as being a battery, an alternating current power source is within the scope of this disclosure, particularly as the same may be found necessary for operating the Selsyn motor system. Reference numeral 23 designates an electric plug in parallel with the plug 22 and which may be located remotely from the latter to enable the chart to be moved to a different location of the vessel and plugged into the leads 14 and 15, or the use of a second chart at a different location. Reference numeral 24 designates an on-off switch for the Selsyn motor system to break the circuit of leads 14 and 15 during intervals when a position plot is not required by the navigator. While it may be desirable to deactivate the Selsyn motors when position plotting is not needed, the radio direction finders may conveniently remain energized and operative to avoid the necessity of re-tuning and homing them on their respective transmitters.

In operation the plotter may be operated as follows: With the vessel at a known location, the azimuth table is rotated to a predetermined azimuth setting as indicated by compass 11, such as North. While holding this azimuth setting of the table, the radio direction finders are then tuned to and oriented toward two distant transmitters whose locations are shown on the chart 26. The bases of the Selsyn motors for the bearing indicators are then placed in position over such transmitters and adjusted, before tightening the screws 16b and 17b, so that the indicators 18 and 19 intersect at the known location of the vessel on the chart. Thereupon the screws may be tightened and the azimuth table released from its North azimuth setting. Now the vessel may proceed as willed, and whenever the operator desires to note vessel position, he swings the table 1 to the North azimuth setting and the intersection of the indicators 18 and 19 will show the position.

Should a continuous automatic plot be desired, utilization of automatic azimuth maintenance of the table 1 as suggested by my U.S. Pat. No. 3,623,102 may be employed.

I claim:

1. A position plotter comprising, in combination:
   a pair of independently rotatable bearing indicators for sweeping a navigation chart and positionable with their axes of rotation over a pair of radio transmitter locations designated on the chart,
   a pair of automatic radio direction finders each having a directional antenna tunable to one of the pair of transmitters whose locations are designated on the chart,
   an azimuth table rotatable independently of the navigation chart,
   said directional antennae mounted on the table for rotation independently thereof,
   means associated with the azimuth table for indicating rotated azimuth position of the table,
   motor means on the table for rotatably positioning and holding the antennae in fixed rotated relation to said pair of distant transmitters to which the antennae are tuned,
   sensing means on the table for sensing relative rotation between the antennae and the table,
   and motor means associated with each of said bearing indicators and connected to said sensing means and responsive to the latter sensing relative rotation between one of the antenna and the table to cause the associated indicator to sweep the chart in accordance therewith, and, when the table is at a predetermined azimuth position, indicate at the intersection of the bearing indicators the position on the navigation chart.

2. The invention defined in claim 1 characterized in that a servo system is connected to each directional antenna and a respective bearing indicator for enslaving the position of the indicators to the position of the antenna relative to the table.

3. The invention defined by claim 1 characterized in that a magnetic compass is mounted on the azimuth table and comprises the means for indicating rotated azimuth position of the table.

4. The invention defined by claim 1 characterized in that means are provided for rotating the azimuth table to maintain a predetermined azimuth setting thereof.

* * * * *